United States Patent Office 2,855,401
Patented Oct. 7, 1958

2,855,401

CERTAIN N-(AMINOPHENOXY PENTYL) SULFONAMIDE OR SACCHARINE COMPOUNDS AND HIGHER HOMOLOGUES

Harry James Barber, Gidea Park, Raymond Frederick Collins, Harold Wood, and Michael Davis, Upminister, England, assignors to May & Baker Limited, Dagenham, England, a British company No Drawing. Application January 27, 1958
Serial No. 711,152

Claims priority, application Great Britain April 30, 1954

6 Claims. (Cl. 260—301)

This invention is for improvements in or relating to amines and to processes for their preparation and has for its object the provision of new, therapeutically active substances. This application is a continuation-in-part of applicants' Serial No. 503,820, filed April 25, 1955, now abandoned.

The new substances of the present invention are the N-p-amino-phenoxyalkyl-amides represented by the general formula:

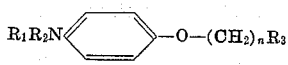

wherein $R_1$ and $R_2$ are each selected from hydrogen, lower alkyl and lower hydroxyalkyl, $n$ is an integer from 5 to 9 and $R_3$ is a group selected from methanesulphonamido ($-NHSO_2CH_3$), benzenesulphonamido

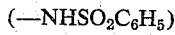

($-NHSO_2C_6H_5$)

and o-sulphobenzimido

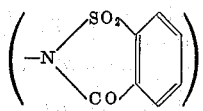

The term "lower" is used to denote alkyl groups of 1 to 2 carbon atoms.

The new substances may be prepared and used in the form of their acid addition salts, and such salts are within the scope of the present invention. Also within the scope of the present invention are amine derivatives such as those commonly used in pharmaceutical practice, such as formaldehyde bisulphite addition products.

The said new compounds have been found to possess valuable therapeutic properties, particularly in the treatment of bilharziasis. The said new compounds may be prepared by the condensation of a compound of the formula

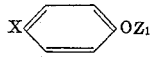

with a compound of the formula $Z_2Y$ wherein X represents a tertiary amino group or an atom or group capable of being replaced by or converted into a primary, secondary or tertiary amino group, Y represents the group $R_3$ or an atom (e. g. a halogen atom) or group which can be replaced by or converted into the group $R_3$ and $Z_1$ and $Z_2$ are atoms or groups capable of reacting together to produce the linkage $(CH_2)_n$ or a corresponding less saturated hydrocarbon linkage. If necessary the groups X and Y are then converted into the groups $NR_1R_2$ and $R_3$ respectively and, also if necessary, a said less saturated hydrocarbon linkage is reduced to form the group $-(CH_2)_n-$.

Among the groups which may be represented by X are:

(a) Groups convertible into primary amino groups: acylamido, carbonamido, nitro, nitroso, alkoxycarbonylamido, anil and arylazo groups;

(b) Groups convertible into secondary amino groups: anil, alkoxycarbonylamido and acylamido groups (by reduction) and acylalkylamido groups (by hydrolysis); and (c) Tertiary amino groups or groups convertible into tertiary amino groups on the form of quaternary ammonium groups (by pyrolysis) and acylalkylamido groups (by reduction).

Examples of groups which may be represented by Y are:

(a) Acetamido, benzamido, diacetamido, succinimido, phthalimido and benzenesulphonamido groups. One acylamido group may be converted into another by hydrolysis (or in the case of the phthalimido group by treatment with hydrazine) and subsequent acylation (including sulphonylation); and (b) A nitro group which may be converted by reduction and subsequent acylation (including sulphonylation).

Examples of groups which may be represented by $Z_1$ and $Z_2$ are hydrogen and alkali metal atoms and the groups $Q-(CH_2)_n-$ where Q represents the radical of a reactive ester such as a methanesulphonate radical of a halogen atom.

In addition, compounds of the foregoing general formula and containing primary or secondary amino groups may be converted into products containing more highly substituted amino groups by known methods. For example, a product containing a primary amino group may be reacted with an alkylating agent or alkylene oxide.

It is not, of course, necessary that X when not identical to $NR_1R_2$ shall be convertible or replaceable thereby in a single step. Thus, if X represents a hydrogen atom the resulting condensation product may first be nitrated (by means of nitric acid) whereafter the nitro group is reduced to amino and, if required, the resultant amine is alkylated. The same considerations apply to the radical Y.

It will be apparent to those skilled in the art that the particular reaction and the sequence of reactions will in many cases be determined by the values desired for $R_1$, $R_2$ and $R_3$ and by the appropriate value selected for the groups X and Y. The methods employed for carrying out the various steps in the processes of the present invention are known per se and have been previously described in the literature.

The present invention includes within its scope pharmaceutical preparations containing one or more compounds of the aforesaid general formula or an acid addition salt or other simple derivative thereof for use in the treatment of bilharziasis in which the active material is associated with a pharmaceutical carrier which may be either a solid material or liquid. The compositions may take the form of elixirs or of tablets, powders, capsules, or other dosage forms which are particularly suitable for oral ingestion. Liquid diluents are employed in sterile condition for parenteral use, that is, by injection. Such a medium may be a sterile liquid such as water. The compositions of the invention may take the form of active material, admixed with solid diluents and/or excipients such as starch, lactose, talc, stearic acid, magnesium stearate, gums or the like. Any of the tabletting materials used in pharmaceutical practice may be employed where there is no possibility of incompatibility with the active therapeutic agent. Alternatively, the active therapeutic agent may, with or without its adjuvant material, be placed in the usual capsule of resorbable material such as the usual gelatine capsule and administered in that form.

The therapeutic value of the compounds of the invention may be shown by their activity against Schistosoma mansoni and in the following test data compounds according to the present invention are shown in comparison with 1-m-diethylaminophenoxy-2-methanesulphonamidoethane (United States Patent No. 2,592,364) to show the criticality of the various classes of compounds with which the present invention is concerned.

TEST PROCEDURE

Mice were infected intraperitoneally with cercariae of S. mansoni (80–120 per mouse). After 7–8 weeks they were treated daily for four days by mouth with an aqueous solution or suspension of the drugs. The mice were killed and examined 7–14 days after the end of treatment and compared with untreated controls from the same batch of infected animals. If no living worms were found in a treated mouse it was considered to be cured.

COMPOUNDS TESTED

The compound

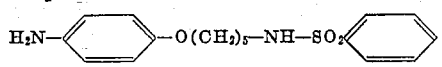

herein identified as A.

The compound

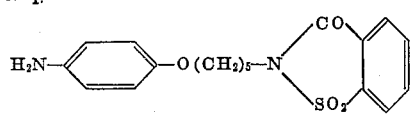

herein identified as B.

The compound

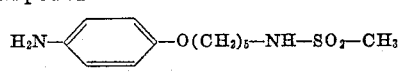

herein identified as C.

The compound

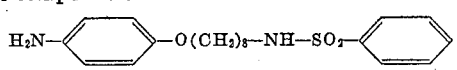

herein identified as D.

The compound

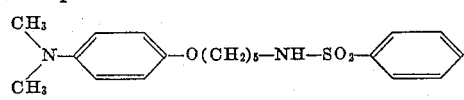

herein identified as E.

The compound

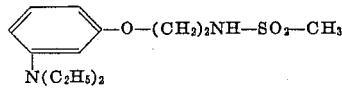

herein identified as F.

RESULTS OBTAINED

| Compound | Acute oral LD$_{50}$, mg./g. | Daily therapeutic dose, mg./g. (oral) | Total No. of mice | Total No. of worms | Average No. of worms per mouse | Standard error |
|---|---|---|---|---|---|---|
| A | >4.0 | 1.0 | 12 | 1 | 0.08 | ±0.08 |
|   |      | 0.4 | 12 | 13 | 1.1 | ±0.3 |
| Controls | | | 11 | 39 | 3.8 | ±0.9 |
| B | >4.0 | 1.0 | 9 | 1 | 0.1 | ±0.1 |
|   |      | 0.2 | 13 | 74 | 5.7 | ±1.0 |
| Controls | | | 10 | 190 | 19.0 | ±4.4 |
| C | 0.9 | 0.25 | 9 | 20 | 2.2 | ±0.4 |
| Controls | | | 11 | 104 | 9.5 | ±3.9 |
| D | >4.0 | 0.4 | 5 | 1 | 0.2 | ±0.2 |
| Controls | | | 7 | 77 | 11.0 | ±4.2 |
| E | >4.0 | 1.0 | 12 | 0 | 0.0 | |
| Controls | | | 17 | 180 | 10.6 | ±3.1 |
| F | 2.0 | 0.4 | 13 | 104 | 8.6 | ±1.4 |
| Controls | | | 15 | 103 | 6.8 | ±0.9 |

In the above table the column headed Average No. of worms per mouse shows the activity of the tested compounds. The toxicity value LD$_{50}$ is the dose in milligrams of drug per gram of mouse causing the death of 50% of the mice after a single dose so that lower values indicate higher toxicity.

Analysis of the results set forth above shows as follows:

(a) That compound F is substantially ineffective.

(b) That compounds A, B, D and E are wholly effective in the sense that they established a cure within the framework of the test.

(c) That compound C though not establishing a "cure" is nevertheless very effective.

The following examples illustrate the production of compounds according to the invention:

Example I

A solution of 5-p-nitrophenoxypentyl bromide (3.6 g.) and soluble saccharine (4.0 g.) in ethanol (25 ml.) was refluxed for 3 hours, cooled and filtered. The solid product was washed with water and crystallised from ethanol, yielding 1-p-nitrophenoxy-5-(2:3-dihydro-1:1:3 - trioxobenzoisothiazol-2-yl)-pentane M. P. 125–127° C. Reduction of this nitro compound (19.6 g.) with hydrogen over 2% of platinum oxide in ethanol (300 ml.) at 74° C. (260 lb. per sq. in.) gave 1-p-aminophenoxy-5-(2:3-dihydro-1:1:3-trioxobenzosiothiazol-2-yl)-pentane [N-5-p-aminophenoxypentyl)saccharine] M. P. 114–115° C. (Compound B above.)

Example II

Methanesulphonyl chloride (17.2 g.) was added to a solution of 5-amino-1-p-nitrophenoxypentane (33.6 g.) in pyridine (100 ml.) and the mixture was kept overnight and then diluted with water and filtered. Crystallisation of the product from ethanol (using charcoal) gave 1-p-nitrophenoxy - 5 - methanesulphonamidopentane M. P. 94–96° C. Reduction of this compound (20.6 g.) by hydrogen over Raney nickel in ethanol (300 ml.) at 74° C./74 lb. per sq. in. gave 1-p-aminophenoxy-5-methanesulphonamidopentane M. P. 122–123° C. (Compound C above.) Similarly prepared were:

1-p-nitrophenoxy-5-benzenesulphonamidopentane M. P. 67–68° C. which when reduced by the method of Example I gave 1-p-aminophenoxy-5-benzenesulphonamidopentane M. P. 124–126° C. (compound A above).

1-p-nitrophenoxy-8-benzenesulphonamidooctane, M. P. 73–75° C. which on reduction yields 1-p-aminophenoxy-8-benzene-sulphonamidooctane M. P. 121–122° C. Compound D above.)

Example III

A mixture of 1-p-aminophenoxy-5-benzenesulphonamidopentane (1.4 g.), sodium bicarbonate (0.7 g.), methyl iodide (5 ml.) and ethanol (10 ml.) was refluxed for 20 hours, cooled and filtered. The product was recrystallised from water, yielding the quaternary iodide M. P. 183–185° C. Pyrolysis of this iodide at 20 mm. pressure and recrystallisation of the residue from ether yielded 1-p-dimethylaminophenoxy-5-benzenesulphonamidopentane M. P. 70–72° C. (Compound E above.)

Example IV

N-acetyl-p-methylaminophenol (66 g.) and 5-phthalimidopentyl bromide (118.3 g.) were added to a solution of sodium (9.2 g.) in ethanol (400 ml.). The mixture was refluxed for 20 hours, cooled, diluted with water, and extracted with chloroform. The extract was washed with 2 N sodium hydroxide and water, dried and evaporated to dryness. Recrystallisation of the residue from ethanol or a chloroform-ether mixture gave N-acetyl-1-p-methylaminophenoxy-5-phthalimidopentane, M. P. 83–85° C.

A mixture of N-acetyl-1-p-methylaminophenoxy-5-phthalimidopentane (63.2 g.), 60% hydrazine hydrate (20.8 ml.) and ethanol (150 ml.) was refluxed for 1 hour, then evaporated to dryness. The residue was shaken with warm 2 N sodium hydroxide and chloroform, and the chloroform solution was separated, washed and evaporated to dryness. The residue was stirred with 2 N sodium hydroxide at room temperature whilst benzenesulphonyl chloride (36.75 g.) was slowly added. After 30 minutes, the mixture was extracted with chloroform, the extract was washed with dilute hydrochloric acid and water, and dried and evaporated to dryness. Crystallisation of the residue from a mixture of toluene and light petroleum (B. P. 40–60° C.) yielded N-acetyl-1-p-methylaminophenoxy - 5 - benzenesulphonamidopentane, M. P. 109–111° C.

A mixture of N-acetyl-1-p-methylaminophenoxy-5-benzenesulphonamidopentane (65.0 g.), 2 N-hydrochloric acid (91 ml.) and acetic acid (91 ml.) was refluxed for 48 hours, evaporated to dryness in vacuo and cooled. The residue was dissolved in hot water, filtered through "Hyflo Supercel" (regd. trademark) cooled and made alkaline with 2 N sodium hydroxide. The solid product was filtered and recrystallized from ethanol, giving 1-p-methylaminophenoxy - 5 - benzenesulphonamidopentane, M. P. 85–85° C.

Example V

A mixture of 1-p-methylaminophenoxy-5-benzenesulphonamidopentane (11.1 g.), calcium carbonate (5.6 g.), ethylene chlorohydrin (6 ml.) and water (20 ml.) was stirred and refluxed for 20 hours, then cooled, shaken with chloroform and filtered through "Hyflo Supercel" (regd. trademark). The chloroform solution was separated, dried and evaporated to dryness, and the residue was crystallized from a benzene-light petroleum (B. P. 40–60° C.) mixture, giving 1-p-[N-(2-hydroxyethyl)-N-methylaminophenoxy] - 5-benzenesulphonamidopentane, M. P. 76–78° C.

Example VI

A mixture of 1-p-methylaminophenoxy-5-benzenesulphonamidopentane (3.48 g.), n-propyl iodide (3 ml.), sodium carbonate (0.53 g.) and ethanol (10 ml.) was refluxed for 20 hours and evaporated to dryness. The residue was heated over a free flame in vacuo until no more volatile iodide was evolved. The residue was extracted with ether, giving 1-p-(N-methyl-N-propylaminophenoxy)-5-benzenesulphonamidopentane, an oil.

We claim:

1. A compound of the general formula:

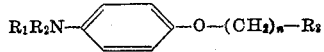

wherein $R_1$ and $R_2$ are each selected from the class consisting of hydrogen, alkyl groups containing 1–2 carbon atoms and hydroxyalkyl groups containing 1–2 carbon atoms, $n$ is an integer from 5 to 9 and $R_3$ is a group selected from the class consisting of methanesulphonamido, benzenesulphonamido and o-sulphobenzimido groups.

2. The compound N-(5-p-aminophenoxypentyl)saccharine.

3. The compound 1-p-aminophenoxy-5-methanesulphonamidopentane.

4. The compound 1-p-aminophenoxy-5-benzenesulphonamidopentane.

5. The compound 1-p-aminophenoxy-8-benzenesulphonamidooctane.

6. The compound 1-p-dimethylaminophenoxy-5-benzenesulphonamidopentane.

No references cited.